United States Patent [19]

Kavathekar et al.

[11] Patent Number: 5,572,631
[45] Date of Patent: Nov. 5, 1996

[54] COMMON FONT RASTERIZER AVAILABLE TO MULTIPLE PRINTER PERSONALITIES

[75] Inventors: Jitendra Kavathekar; Chris R. Gunning; Cheryl S. Freeman, all of Boise, Id.

[73] Assignee: Hewlett-Packard Company, Palo Alto, Calif.

[21] Appl. No.: 242,210

[22] Filed: May 13, 1994

[51] Int. Cl.⁶ .................................................. G06K 15/00
[52] U.S. Cl. ......................................... 395/115; 395/110
[58] Field of Search ................................... 395/150, 151, 395/102, 110, 115, 162, 164

[56] References Cited

U.S. PATENT DOCUMENTS

| | | | |
|---|---|---|---|
| 5,113,494 | 5/1992 | Menendez et al. | 395/163 |
| 5,379,431 | 1/1995 | Lemon et al. | 395/700 |

OTHER PUBLICATIONS

Parkhurst et al., "Connectivity of the HP Desk Jet 1200c Printer", *Hewlett–Packard Journal*, v. 45, n. 1, p. 85(13), Feb. 1994.

*Primary Examiner*—Heather R. Herndon
*Assistant Examiner*—Joseph R. Burwell
*Attorney, Agent, or Firm*—Anthony J. Baca

[57] ABSTRACT

A printer that allows a plurality of personalities access to a common rasterizer. The printer is constructed of an operating system, a scaleable font and a personality interface. The scaleable font is logically connected to the operating system as is the personality interface. Additionally, the personality interface is logically connected to the plurality of personalities and the common rasterizer. The personality interface allows the plurality of personalities to communicate with the operating system and the common rasterizer. When the operating system receives a print job, it activates one of the plurality of personalities to become an active personality. Next, the operating system sends the print job through the personality interface to the active personality and gives the active personality exclusive access to the common rasterizer.

9 Claims, 2 Drawing Sheets

COMMON FONT RASTERIZER AVAILABLE TO MULTIPLE PRINTER PERSONALITIES

TECHNICAL FIELD

This invention relates to data processing systems that employ multiple printer languages and more particularly, to a printer system with multiple personalities all of which share a common rasterizer or scaler.

BACKGROUND OF THE INVENTION

Typically, when a user wishes to print a document, the host computer first translates the document from a language that the host application understands to one that the printer understands. By proper use of the printer language, the host computer instructs the printer what to print. In a modern printing environment, there may be multiple printer languages, also referred to as personalities, available to the user. Each personality, in turn, may access multiple fonts in order to properly process a print job. Hence, prior to the present invention a printer with multiple language personalities may have multiple copies of the same font.

As briefly stated above, a software/firmware module, which embodies the necessary instructions to properly accept incoming data in a particular printer language and convert that representation to a physical one, is referred to as a printer personality. In performing this task, the personality may do things beyond the scope of this discussion such as accepting and storing downloaded fonts, selecting and deselecting printer settings, giving feedback to the host on the status of a print job, etc.

Each personality uses resources of the printer to execute its job. Such resources include Random Access Memory (RAM), Read Only Memory (ROM), Hard Disk, I/O channels, control panel, paper trays, and print engine. As mentioned earlier, multiple personalities may reside in the printer allowing the user to use the same printer with a variety of applications and hardware. These personalities may share printer resources or partition the resources in such a way that there is minimal interaction between personalities. Examples of printer languages include PCL™, ESC/P™, PostScript™, and PCPR-201. PCL is a trademark of Hewlett Packard Company; ESC/P is a trademark of Seiko Epson Kabushiki Kausha.; PostScript is a trademark of Adobe Systems Inc.

Characters, which are printed on a page, typically come from fonts that reside in the printer. A font is a collection of characters that have similar characteristics. As is understood in the art, there are two primary formats, bitmap and outline.

Bitmap fonts represent each character in bitmap form. These fonts are generally stored in the printer in some native resolution. Use of a bitmap font is quick and easy because the printer personality directly accesses the bitmap of the character that it is looking for. In a printing environment where multiple printing resolutions are available or multiple sizes of characters are required to be printed, post processing of the character bitmap must be performed. This post-processing will degrade the quality and performance of the printer. Typically, line printer based personalities use bitmap fonts.

The other major type of fonts are outline fonts, which are more complex and flexible. Instead of each character stored as a bitmap, outline fonts store each character as a set of instructions that describes the characters. Associated with a class of outline fonts is a module called a rasterizer or scaler. This rasterizer processes the instructions describing the character and produces a bitmap of the character. Outline fonts allow the personality to access characters and ultimately get bitmaps of those characters in various sizes, resolutions, orientations, and other characteristics. Thus, with one font description, characters of multiple sizes, resolutions, etc., can be used. Examples of outline fonts include Apple's TrueType™ format and Adobe's Type I font format.

Some printing environments or situations add extra challenges to supporting multiple personalities or multiple fonts. For example, both these challenges exist in a Japanese printing environment. There are a variety of printer languages in the Japanese market; character based software typically uses line printer languages while Graphical User Interface (GUI) based software uses page description languages. For line printer based personalities bitmap fonts may be used, for page description personalities outline fonts may be used.

The size of Japanese fonts presents an additional challenge. The Japanese character set is large (4000–6000 characters). Storage of these large fonts, at 3–4 Mb typically, is very expensive. Furthermore, enhancements such as scaling in one or two dimensions, italics, and character rotations are often used. Most rasterizers support the major enhancements. Therefore, outline fonts are well suited for representing Japanese fonts. However, because of the size of these fonts, it is necessary that any potential duplication of the fonts be eliminated.

SUMMARY OF THE INVENTION

In order to accomplish the present invention, there is provided a printer that supports a plurality of personalities. The printer allows the plurality of personalities access to a common rasterizer. To accomplish this, the printer is constructed of an operating system, a scaleable font and a personality interface. The scaleable font is logically connected to the operating system as is the personality interface. Additionally, the personality interface is logically connected to the plurality of personalities and the common rasterizer. The personality interface allows the plurality of personalities to communicate with the operating system and the common rasterizer.

When the operating system receives a print job, it activates one of the plurality of personalities to become an active personality. Next, the operating system sends the print job through the personality interface to the active personality and gives the active personality exclusive access to the common rasterizer.

DETAILED DESCRIPTION OF THE PREFERRED EMBODIMENTS

As used here, a personality is a program that accepts print language commands and translates them into a printer dependent descriptions of output pages. In general, the personality receives input data from the printer data channel, interrogates the system state, obtains the installed print resources (such as fonts), and outputs printer dependent page descriptions. The personality has no specific knowledge of how the I/O, the print engine, the control panel, or any other printer hardware works. The translation of the display list into a video data stream occurs under the direction of the system code, based upon its management of the page pipeline.

A switchable personality is a specially constructed personality that is selected or de-selected by the hosting printer to interpret the input data stream. The system and/or personality detects print job boundaries in the input data stream. Each print job is vectored by the system to one of the installed switchable personalities. The selected personality processes the input data stream until an end-of-job boundary is detected. Upon detecting the end-of-job boundary, the personality relinquishes control back to the system code.

Switchable personalities can be built into the original printer firmware or may be added to the system after the printer is sold. Using a well-defined interface and a layered design, the hosting firmware knows nothing about the personality command language, and the personality has limited knowledge of the detailed operations of the printing platform. The interface between host and personality becomes static at the time the system is released and remains static through the life of the product so that it can support personalities created in the past and in the future.

Figure 1:
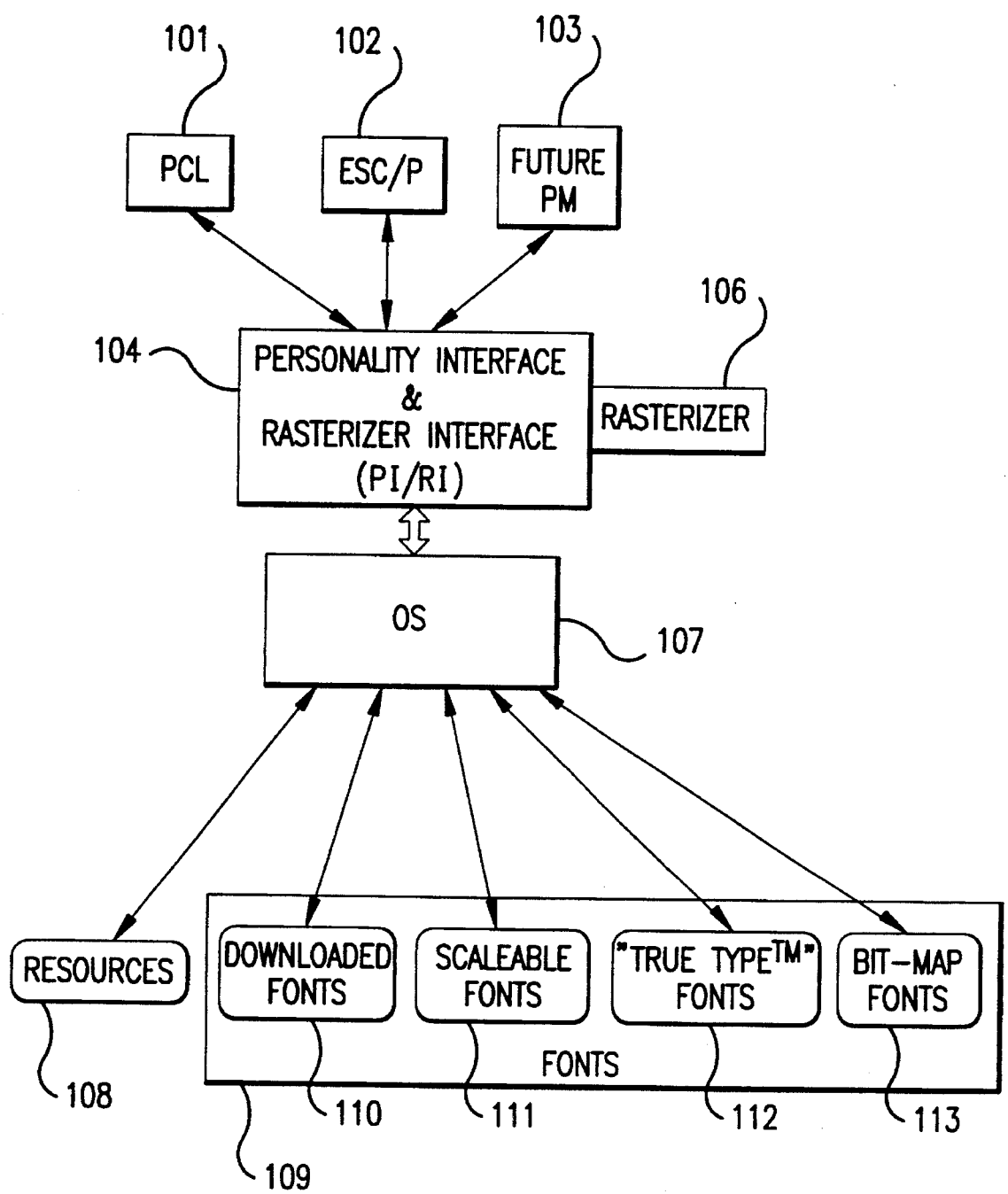
FIG. 1 is a block diagram showing the architecture in accordance with the present invention.

Referring now to FIG. 1 where the preferred embodiment of the present invention is shown. Using the present invention, the overall operating system 107 is isolated from the individual personality modules 101 through 103. Isolation is accomplished through personality interface 104. The additional layer of personality interface and rasterizer interface (herein referred to as PI/RI) 104 allows the individual personality modules to be self sustaining. Thus, each personality module can be created independently and with little knowledge of the underlying operating system 107. Operating system 107 has sole control over the system resources 108 which includes things such as input/output, RAM, ROM and the print engine itself. The OS 107 also maintains the banks of fonts 110 through 113. Fonts can originate from various sources such as bitmap foots 113, scaleable fonts 111, the more specific scaleable font of a TRUE TYPE font 112 and various other formats that can be downloaded into 110.

As shown in FIG. 1, personality interface has three personality modules to which it attends. Namely, printer control language module 101, ESC/P personality module 102 and a future personality module 103 as yet defined. FIG. 1 is not intended to imply nor limit the present invention to supporting only three personality modules or these specific three. Other personality modules could include a POSTSCRIPT module or a PCPR-201 module or any other as yet undefined printer language personality module.

As stated above, many personality modules tend to include their own resources, in particular their own rasterizer. As printers begin to support more personality modules such duplication of resources and rasterizers consumes valuable memory space. Thus, many of the resources and in particular the rasterizer and fonts are not an integral part of the personality modules. To reduce this duplication, the rasterizer has become part of the PI/RI 104.

Rasterizer 106 is logically connected to the personality interface through a rasterizer interface. With this arrangement any of the personality modules can directly access the rasterizer 106. A personality module can gain access to the rasterizer 106 in three possible ways. As a first embodiment, the personality module can handle the individual tasks of font retrieval and scaling. Thus for example, if PCL 101 is the active personality module and it encounters a scaleable font, it makes a request of the OS 107 to supply it with the particular font. This request is passed through PI/RI 104 prior to being received by operating system 107. In PI/RI 104, the personality module requests are interpreted and converted to a request that the OS 107 can understand. In this particular example, PCL 101 has requested a particular scaleable font. OS 107 interprets the request and the appropriate font information is retrieved from scaleable font 111. This information is passed back through PI/RI 104 to PCL 101. Because this is a scaleable font, the rasterizer 106 must now be invoked to scale the requested character font to the appropriate size. With this embodiment, PCL 101 requests, through PI/RI 104, that the characters be scaled to a specific point size. The request is passed through PI/RI 104 such that, rasterizer 106 can scale the font to the desired size. Finally, the output of the rasterizer 106 is routed back through PI/RI 104 to PCL 101.

Using an alternative embodiment, when PCL 101 requests a specific scaleable font at a given font size, PI/RI 104 interprets that command and requests OS 107 to retrieve the font information from 111. Upon receiving the font information PI/RI 104 then directs the font information to the rasterizer 106, which then renders the font characters to the appropriate size. Once scaling is completed by rasterizer 106, PI/RI 104 sends the information to PCL 101.

Yet another embodiment places the rasterizer 106 under direct control of the personality module. With this embodiment, PCL 101 issues a request for a font at a given size as before. However, this request is sent to the rasterizer 106. The rasterizer 106 then requests the proper font information through the rasterizer interface portion of PI/RI 104. Next the rasterizer 106 scales the font characters to the requested size and finally passes the bitmap characters to PCL 101.

Other personality modules such as ESC/P 102 or future personality modules 104 gain access to the fonts and rasterizer in the same manner as described for PCL 101.

The data flow in the system can be thought of as a pipeline. Data flows from the input I/O port to the print engine and has "valves" along the way that can be turned on and off to control the flow through the system. The system has a number of valves that can be shut off to stop the data flow through the system. This allows the system to make more efficient use of memory, and also keeps any data loss that could occur to a minimum.

Thus, using the pipeline analogy to describe data flow in FIG. 1, personality modules 101–103 request font information through PI/RI 104. Data then flows through PI/RI 104 to OS 107, which then retrieves the appropriate information from font bank 109. Retrieved font information then flows back to PI/RI 104. Here, depending upon the font type, the data flow may be diverted through rasterizer interface to rasterizer 106. Such data is then rasterized and passed back to PI/RI 104 where it is finally piped back to the appropriate personality module.

An example may aid the reader in understanding the data flow in FIG. 1. In this example two pages will be printed, the first page or job received uses PCL language. This page will include only TRUE TYPE fonts. The second page or job is received in the ESC/P language. This page will include TRUETYPE fonts, a bitmap font and one other previously downloaded font.

Data flow for the first job is received through resources 108, as stated resources 108 contains I/O. Received information is sent to OS 107 where it is interpreted and passed onto PI/RI 104. Either OS 107 or PI/RI 104 can activate the appropriate personality module and in this case, that is PCL 101. The job information is passed to PCL where it is processed.

PCL demands various system resources of OS 107 with such demands passing through PI/RI 104. These demands may include such things as: memory usage, font requests, which will be described in more detail later, and help outputting information to the print engine 108. As PCL 101 is processing the job for the first page, a request will be made for a specific TRUE TYPE font. As described earlier, this request may be processed in one of several ways.

Using the first embodiment, the request is piped through PI/RI 104 to OS 107. OS 107 retrieves the requested information from font bank 109 and pipes it back to PCL 101 through PI/RI 104. Next, PCL 101 pipes the font information to rasterizer 106 through PI/RI 104 where the requested characters are scaled. The resultant bitmap characters are finally piped back to PCL 101 through PI/RI 104.

Using the second embodiment, the request passes through PI/RI 104 to OS 107. OS 107 retrieves the requested information from font bank 109 and passes it back to PI/RI 104. PI/RI 104 diverts the font information to rasterizer 106. Once the requested character font has been scaled to the desired size by rasterizer 106, the data is forwarded through PI/RI 104 and eventually to PCL 101.

In yet another embodiment, the request passes through PI/RI 104 to rasterizer 106. Rasterizer 106 retrieves the requested information from font bank 109. Next, rasterizer 106 produces the resultant bitmap characters and passes it to PCL 101 through PI/RI 104.

Independent of the method used to rasterize the characters, PCL 101 must next render the page or page strip. Once PCL 101 has completed the task of creating the page or page strip that information is passed to OS 107. If PCL 101 contains its own rendering tasks, then the PCL module 101 will actually render the page or strip. Should a particular module not include its own rendering tasks, those tasks can be made available through OS 107.

As with the first job, the second job is received through resources 108 into OS 107. Again OS 107 determines that the particular job is in ESC/P language. The request is made to activate ESC/P 102 and the job is passed to personality module 102 through PI/RI 104. The second job requests fonts from three separate sources. Data flow for TRUE TYPE fonts requests are as stated above.

Requests for a bitmapped font starts with a request by ESC/P module 102 requesting such a font. This requests is processed by PI/RI 104 and then piped onto OS 107. OS 107 retrieves the font information from 113. The font information is then piped back to ESC/P 102 through PI/RI 104. It should be noted that the ESC/P language contains provisions for scaling and other mutations to the bitmapped characters. One skilled in the art will realize that the rasterizer 106 can be used in conjunction with the proper fonts to perform the mutations or even remove the requirement of having separate bitmap fonts 113. Such an approach is integrated into PI/RI 104 whereby when a personality module requests a bitmap font, the PI/RI 104 invokes the rasterizer that ultimately produces the desired bitmap.

When the present job requests a downloaded font 110, whether the downloaded font is a bitmap or scaleable font will determine how the font is processed. Thus, if the requested downloaded font 110 is of a scaleable type, rasterizer 106 must be invoked to scale it to the requested size. If, on the other hand the requested downloaded font is a bitmapped font, the font information is simply passed back to the requesting personality module.

One skilled in the art will realize that it is desirable to allow processing of the second job even prior to completion of the first job. Such job overlap allows a continuous flow of page information through the pipeline of the system. The primary drawback of allowing such job overlap is the increased memory requirements.

Figure 2:
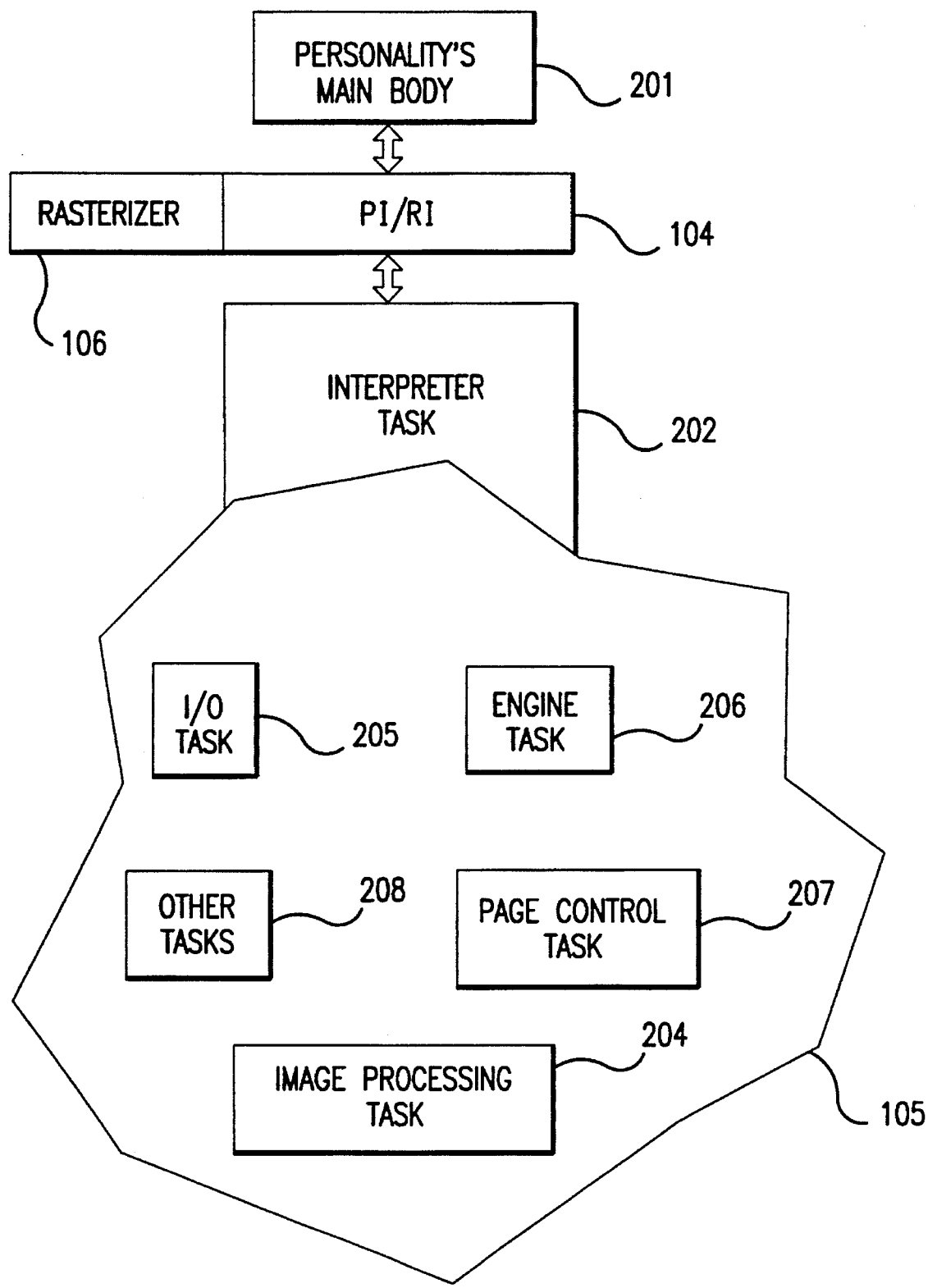
FIG. 2 shows how a switchable personality fits into a system.

FIG. 2 illustrates one way a switchable personality can fit into a system. Data is transferred from the host to the I/O process 205 where it is buffered in the printer. The data is then passed on to the personality where it is parsed and transformed, page by page, into some intermediate format. As each page is formatted, its page intermediate is passed to a page control task 207. This task orchestrates the rendering and printing of the page.

The page control task 207 passes a strip buffer and associated intermediate to an image processing task 204 for rendering. As each strip is completed by the image processing task 204, it is passed on to an engine task 206 for printing. The engine task 206 controls the engine's video hardware, and sets up each strip buffer to be processed in turn.

The OS 107 tasks that invoke personality code for execution are preemptable tasks. They may be preempted (suspended) by the OS 107 when higher priority tasks need time to execute. When a task is preempted, the OS 107 saves all of the processor registers and other critical state information on the task's execution stack. Eventually the preempted task will be allowed to execute again, and the OS 107 will restore the processor registers to their original values.

The personality code may be suspended, more or less voluntarily, at other times during its execution. This may occur when the personality calls one of the system's interface routines for some type of service.

The preemption (suspension) described in the previous paragraphs takes place without the personality necessarily being aware that it is happening. This is different from the overall invocation and termination of the personality, which occurs when the OS 107 makes a conscious decision to start a personality for job processing, or when a personality makes a conscious decision to terminate. The OS 107 and personality provide specific interface routines for this purpose.

To construct output pages, the personality must have knowledge of certain engine characteristics 108. The personality must map user requests for various media types and sizes into the set of media types supported by the engine 108. The personality must also specify the desired source tray and destination bin for each page, particularly if the user made an explicit selection. This exchange of information is accomplished through the engine task 206. This interface is not intended to provide the personality with any detailed knowledge of, or control over, any engine printing processes.

The I/O task 205 provides the personality access to an input data channel and a data channel. For input, the personality will be passed buffers of "raw" data, which is exactly as received by the I/O, with no preprocessing by the system. For output, the personality passes buffers of data that are sent as indivisible units. This rather primitive interface preserves the system's independence from any personality specific data transformations, yet still insulates the personality from the details of managing the system's I/O devices.

Although the preferred embodiment of the invention has been illustrated, and that form described, it is readily apparent to those skilled in the art that various modifications may be made therein without departing from the spirit of the invention or from the scope of the appended claims.

What is claimed is:

1. A printer comprising of:

an operating system;

a scaleable font logically connected to said operating system;

a personality interface logically connected to said operating system;

a common font rasterizer logically connected to said personality interface; and a plurality of personalities logically connected to said personality interface.

2. A printer as claimed in claim 1 wherein said personality interface allows said plurality of personalities to communicate with said operating system and said common font rasterizer.

3. A printer as claimed in claim 1 wherein said operating system, upon receiving a print job, activates one of said plurality of personalities to become an active personality, said operating system then sends said print job through said personality interface to said active personality, said active personality having exclusive access to said common font rasterizer.

4. A method of supporting a plurality of personalities with a common font rasterizer in a printer, said method comprising the steps of:

receiving a print job, said print job being destined for one of said plurality of personalities;

activating said one of said plurality of personalities to become an active personality;

said active personality issuing a request for font information, said request encoded in an active personality format;

converting said request from said active personality format to a system format;

retrieving said font information from said font bank;

scaling said font information by said common font rasterizer to produce a bitmap character; and passing said bitmapped character to said active personality.

5. A method as claimed in claim 4 wherein said step of scaling further comprising the steps of:

sending said font information to said active personality;

forwarding said font information to said common font rasterizer; and rasterizing said font information to produce said bitmap character.

6. A method as claimed in claim 4 wherein said step of scaling further comprising the steps of:

forwarding said font information to said common rasterizer; and rasterizing said font information to produce said bitmap character.

7. A method as claimed in claim 4 wherein said common font rasterizer receiving said system format request, said common font rasterizer performing said step of retrieving and said step of scaling.

8. A printer having a single font rasterizer and a plurality of printer personalities, said printer comprising:

an operating system;

a scaleable font connected to said operating system;

a personality interface means for allowing said plurality of personalities to communicate with said operating system, said personality interface means furthering allowing said plurality of personalities to communicate with said single font rasterizer.

9. A printer as claimed in claim 8 wherein said personality interface means translates a personality request to a system requests and system responses to personality responses, when an active personality requests use of said single font rasterizer, said personality interface means connects said single font rasterizer to said active personality.

* * * * *